United States Patent Office 3,182,022
Patented May 4, 1965

3,182,022
ORGANIC ADDUCTS AND LUBRICATING
COMPOSITIONS THEREOF
William R. Siegart, Poughkeepsie, Norman R. Odell,
Wappingers Falls, and Herman D. Kluge, deceased, late
of Fishkill, N.Y., by Hazel E. Kluge, administratrix,
Fishkill, N.Y., assignors to Texaco Inc., New York,
N.Y., a corporation of Delaware
No Drawing. Filed Nov. 14, 1962, Ser. No. 237,730
21 Claims. (Cl. 252—46.6)

This invention relates to novel organic adducts and to lubricating compositions thereof. More specifically, the invention pertains to (1) alkylene oxide and halo-substituted alkylene oxide adducts of hydrolyzed hydrocarbyl acrylate-phosphorus pentasulfide reaction products (hereinafter also termed hydrolyzate), (2) a method of preparing these adducts and (3) lubricant compositions containing said adducts. The invention further relates to heat treated alkylene oxide and haloalkylene oxide adducts of hydrolyzed hydrocarbyl acrylate-$P_2S_5$ reaction products and their use in lubricants.

The adducts of the invention are useful as extreme pressure agents and anti-oxidants in lube oil and greases.

Boardly, the adducts of the invention are prepared by (1) reacting $P_2S_5$ with an alkyl alkylacrylate to form an acrylate-$P_2S_5$ reaction product, (a) hydrolyzing said product with water to form a hydrolyzate of said product and then (3) reacting the hydrolyzate with alkylene oxide or haloalkylene oxide to form the adducts of the invention.

The adduct is in actuality a mixture of products of various chain lengths since during the reaction of the alkyl alkylacrylate with $P_2S_5$, the $P_2S_5$ promotes the polymerization of the acrylate. It is postulated that the principal monomeric adduct formation takes place as schematically expressed by the following equations:

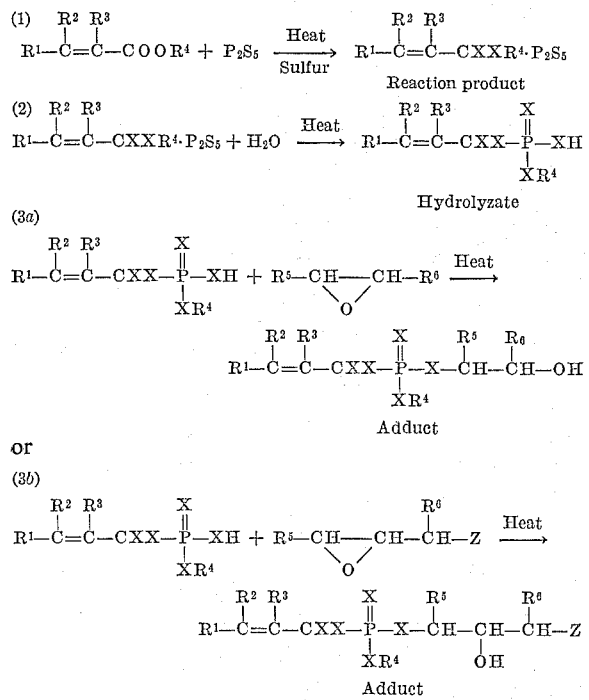

where $R^1$ to $R^6$ are alkyl and/or hydrogen, X is sulfur, oxygen or a mixture thereof, and Z is halogen as hereafter defined.

HYDROLYZATE REACTANT

The hydrolyzate reactant is prepared by reacting $P_2S_5$ with alkyl alkylacrylate in a mole ratio of between 1:1 and 4:1, preferably between about 1:1 and 1.5:1, in the presence of elemental sulfur, e.g., between about 1 and 5 wt. percent based on the initial reactants, at a temperature between about 150 and 200° C. in a non-oxidizing inert atmosphere, for example, under a blanket of nitrogen or argon to form an alkyl alkylacrylate-$P_2S_5$ reaction product, then subsequently hydrolyzing said reaction product at a temperature between about 100 and 150° C. by contact with steam to form hydrolyzed alkyl alkylacrylate-$P_2S_5$ reaction products (or hydrolyzates) and inorganic phosphorus acids.

In the above described reactions, an inert diluent is desirably employed, such as diethylbenzene, toluene, xylene, cumene, ethylbenzene and t-butylbenzene.

The inorganic phosphorus acids formed during the above hydrolysis step are desirably removed prior to the subsequent reaction with alkylene or haloalkylene oxides. A number of different procedures are applicable for removal of inorganic phosphorus acids from the hydrolyzate. U.S. Patent Nos. 2,987,512 and 2,951,835 discloses removal of inorganic phosphorus acids by contact with synthetic hydrous alkaline earth metal silicates, synthetic hydrous alkali metal silicates and synthetic hydrous alkaline earth metal silicates, respectively. In addition, commonly-assigned copending application, Serial No. 841,668, filed September 23, 1959, now Patent No. 3,135,-729, by H. D. Kluge and R. G. Lacoste, describes a process wherein inorganic phosphorus acids are removed from the hydrolyzed product by extraction with anhydrous methanol.

The hydrolyzate reactants can be further purified by standard means such as extraction, filtration, distillation and combinations thereof.

The initial alkyl alkylacrylate reactants contemplated herein are of the formula:

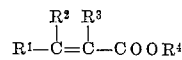

where $R^1$, $R^2$ and $R^3$ are hydrogen or alkyl of from 1 to 4 carbons and $R^4$ is alkyl from 1 to 24 carbons.

Specific examples of the acrylates reacted with $P_2S_5$ are methyl alpha-dodecylacrylate, methyl alpha-tetradecylacrylate, methyl alpha-hexadecylacrylate, methyl alpha-octadecylacrylate, methyl alpha-tetraeicosylacrylate, dodecyl alpha-methylacrylate, tetradecyl alpha-methylacrylate, hexadecyl alpha-methylacrylate, octadecyl alpha-methylacrylate, tetraeicosyl alpha-methylacrylate, dodecyl beta-methylacrylate, tetradecyl beta-methylacrylate, hexadecyl beta-methylacrylate, octadecyl beta-methylacrylate, tetraeicosyl beta-methylacrylate; dodecyl alpha, beta-dimethylacrylate; tetradecyl alpha, beta-dimethylacrylate; hexadecyl alpha, beta-dimethylacrylate; octadecyl alpha, beta-dimethylacrylate; tetraeicosyl beta; beta-dimethylacrylate; hexadecyl beta, beta-dimethylacrylate; octadecyl beta, beta-dimethylacrylate; tetraeicosyl beta, beta-dimethylacrylate; dodecyl alpha, beta, beta-trimethylacrylate; tetradecyl alpha, beta, beta-trimethylacrylate; hexadecyl alpha, beta, beta-trimethylacrylate; octadecyl alpha, beta, beta-trimethylacrylate and tetraeicosyl alpha, beta, beta-trimethylacrylate.

PREPARATION OF NOVEL ALKYLENE AND HALOALKYLENE OXIDE ADDUCTS OF THE INVENTION

Alkylene oxide or haloalkylene oxide of the formula:

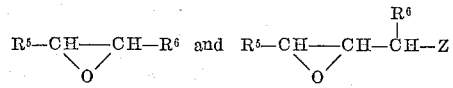

where $R^5$ and $R^6$ are hydrogen and alkyl of from 1 to 6 carbons and Z is halogen, is reacted with the above prepared hydrolyzate at a temperature between about 60 and 150° C. Although atmospheric pressure is normally employed, superatmospheric and subatmospheric pressure may also be utilized. The reaction is desirably conducted in the absence of oxygen and in the presence of an excess of alkylene oxide, preferably in a mole ratio of between about 1:1 and 4:1, more preferably between 1.1:1 and 1.5:1. Excess alkylene oxide is removed after completion of the reaction by standard means, e.g., by blowing the reaction mixture at an elevated temperature, e.g., between about 40 and 100° C., generally with an inert gas such as nitrogen. The adduct products may be further purified by standard means such as fractionation under reduced pressure, clay contacting, or contacting with an ion exchange resin.

Examples of the alkylene oxide and haloalkylene oxide reactants contemplated herein are ethylene oxide, propylene oxide, 1,2-butylene oxide, 2,3-butylene oxide, 1,2-pentylene oxide, 2,3-pentylene oxide, 1,2-hexylene oxide, 3-methyl-1,2-pentylene oxide, 2,3-octylene oxide, 4-methyl-2,3-octylene oxide, 4-methyl-1,2-hexylene oxide, 3-methyl-1,2-butylene oxide, 3-chloropropylene oxide, and 3-fluoropropylene oxide, and 4-bromo-2,3-butylene oxide.

In addition to the foregoing it has been found if the adduct product is reheated to a temperature of between about 150 and 200° C., a product is obtained which is even less corrosive in lubricating compositions than the unheated trithiophosphonates. This heat treatment is believed to cause additional dimerization.

LUBRICANT COMPOSITIONS CONTAINING ADDUCTS OF THE INVENTION

As heretofore stated, the adducts of the invention are useful as extreme pressure (EP) agents and anti-oxidants in lube oil greases.

The hydrocarbon mineral oils useable in this invention can be paraffin base, naphthene base, mixed paraffin naphthene base distillate or residual oils. The lubricating base oil generally has been subjected to solvent refining to improve its lubricity and viscosity temperature relationship as well as solvent dewaxing to remove waxy components to improve the pour of the oil. Broadly speaking, mineral lubricating oils having an SUS viscosity at 100° F. between 50 and 1000 may be used in the formulation of the improved lubricants of this invention, but usually the SUS viscosity range falls between 70 and 300 at 100° F.

The mineral lubricating oils containing the adducts of the invention usually contain other additives designed to impart desirable properties thereto. For example, V.I. improvers, such as the polymethacrylates, and detergents, such as alkaline earth metal alkylphenolates, may be employed.

Synthetic lubricating bases of the ester or ether type may also be used as the lubricating base oil. Higher molecular weight esters of high boiling aliphatic dicarboxylic acids, which possess excellent viscosity-temperature relationships and lubricating properties, are finding ever increasing utilization in lubricating oils adapted for high and low temperature lubrication. Esters of this type are used in the formulation of jet engine oils. Examples of this class of synthetic lubricating bases are the diesters of diacids such as sebacic, adipic, azelaic, and alkenylsuccinic acids. Specific examples of these diesters are di-2-ethylhexyl sebacate, di-2-ethylhexyl azelate, di-2-ethylhexyl adipate, di-n-amyl sebacate, di-2-ethylhexyl n-dodecylsuccinate, di-2-ethoxyethyl sebacate, di-2′-methoxy-2-ethoxyethyl sebacate, di-2′-ethyl-2-epoxyethyl sebacate, di-2-n-butoxyethyl azelate, and di-2′-n-butoxy-2-ethoxyethyl n-octylsuccinate.

Polyester lubricants formed by reaction of an aliphatic dicarboxylic acid of the type previously described and dihydroxy compounds with either a monofunctional aliphatic monohydroxy alcohol or an aliphatic monocarboxylic acid in the specified mole ratios are also employed as the synthetic lubricating base in the composition of the invention. Polyesters of this type are described in U.S. Patent No. 2,628,974. Polyesters formed by reaction of a mixture containing specified amounts of heptanediol, sebacic acid, and 2-ethylhexanol or a mixture containing adipic acid, diethylene glycol, and 2-ethylhexanol illustrate this class of synthetic polyester lubricating oil bases.

Polyalkylene ethers as illustrated by polyglycols can be used as a lubricating base. In the composition of this invention, polyethylene glycols, polypropylene glycols, polybutylene glycols, polyethylene-polypropylene glycols are examples of this class of synthetic lubricating bases.

The greases of this invention essentially comprise a lubricating oil base of the type described above as the chief component containing a fatty soap in sufficient amount to thicken the composition to a grease consistency. The fatty acid soap may be present in the grease in widely varying amount, such as, between from about 5 to 45 wt. percent and normally in amounts from about 7 to 30 wt. percent.

In addition, other additives of various types commonly employed in lubricating greases such as rust inhibitors, oxidation inhibitors, may be also employed. Examples of these other additives are amines of various types such as diphenylamine, alpha and beta-naphthylamines, diphenyl-para-phenylenediamine, and tetramethyldiaminodiphenylmethane.

The fatty acid soaps employed in the greases of the invention may be any of those which have been employed as thickening agents in lubricating greases. The metals employed in the manufacture of the soap may be an alkali metal, alkaline earth metal or polyvalent metal such as aluminum, copper, cobalt and nickel. The preferred soaps are those wherein the metal component is an alkali metal or an alkaline earth metal. The saponifiable material employed in the preparation of the soaps used in the greases of the invention may be any of those usual types comprising higher fatty acids containing at least 12 carbon atoms per molecule which may be saturated, unsaturated, or hydroxy substituted fatty acids. Esters (e.g., glycerides) of such acids or mixtures of free fatty acids and their esters may also be utilized as the saponifiable material. Fatty acid materials may be naturally occurring or derived from naturally occurring materials. They may also be obtained synthetically, as for example, by the oxidation of petroleum fractions. The preferred saponifiable materials are those which comprise at least a major portion of fatty acids containing from about 14 to 22 carbon atoms per molecule. Examples of such preferred acids are myristic acid, palmitic acid, stearic acid, oleic acid, tallow fatty acids, 12-hydroxystearic acid, 9,10-dihydroxystearic acid, behenic acid, or esters of said acids.

The grease preparation may be carried out by standard means, for example, by mixing together the lubricating oil and preformed soap or by saponification in situ of the saponifiable material in a portion of the lubricating oil component of the grease. The adducts are then mixed into the preferred grease, preferably in the final manufacturing step just prior to discharge of the grease from the equipment.

The adducts, whether in lube oil or grease compositions, can be present up to 50 wt. percent in concentrates and between about 0.2 and 10 wt. percent, preferably between 1 and 5 wt. percent, in finished compositions.

The following examples further illustrate our invention but are not to be construed as limitations thereof.

Example I

The example illustrates the preparation of the hydrolyzed alkyl alkylacrylate-$P_2S_5$ reaction product reactant. To a 3-necked reaction flask, fitted with a stirrer, reflux condenser and nitrogen inlet tube, there was added 24 grams (0.75 mole) of sulfur, 444 grams (2.0 moles) $P_2S_5$ and 750 cc. diethylbenzene. The flask was swept for 15 minutes with nitrogen and the contents were heated to 175° C. over a period of 38 minutes. At the end of this period, 676 grams (2.0 moles) octadecyl methacrylate was added over approximately 2½ hours while maintaining the pot temperature of 175–180° C.

Upon completion of the addition of the octadecyl methacrylate, the reaction mixture was heated for 5 hours at 175–180° C., the entire reaction being maintained under dry nitrogen. The final product was steam distilled for 4 hours at a pot temperature of 120° C.±10° C. Upon cooling to room temperature, the residual product was extracted three times with approximately an equal volume of methyl alcohol. The methyl alcohol extract solution containing inorganic acids was separated from the methyl alcohol insoluble materials. The methyl alcohol insoluble liquid was treated with pentane and filtered and the pentane was distilled from the pentane soluble product leaving a black fluid identified as the hydrolyzed octadecyl methacrylate-$P_2S_5$ reaction product.

Analysis of the reaction product gave the following:

| Description: | Found, wt. percent |
|---|---|
| Phosphorus | 3.8 |
| Carbon | 65.2 |
| Sulfur | 19.6 |
| Hydrogen | 10.5 |
| Oxygen (by difference) | 0.9 |
| Neut. No. | 26.1 |

*Example II*

This example further represents the preparation of a hydrolyzate.

To a 3-necked flask, fitted with a stirrer, reflux condenser, gas inlet tube, and thermometer, there was added 12 grams (0.375 mole) elemental sulfur, 222 grams (1.0 mole) $P_2S_5$ and 560 cc. diethylbenzene. The flask was heated to 175–180° C. over approximately an hour period. 100 grams (1.0 mole) of methyl methacrylate was added at 175–180° C. The flask was maintained at 175–180° C. for an additional four hours and during this entire period the reaction was conducted under dry nitrogen. The resultant product was steam distilled at 120° C.±10° C. The residual crude product was mixed with benzene and the benzene was removed at room temperature under water aspirator vacuum. The benzene-treated residue was then mixed with chloroform and filtered and the extract was treated 3 times with equal volumes of water. The chloroform was removed under water aspirator vacuum at room temperature to yield a black semi-solid reaction product having a Neut. No. 121. Elemental analysis of the hydrolyzed $P_2S_5$ methyl methacrylate reaction product found 55.0 wt. percent carbon, 5.60 wt. percent hydrogen, 6.40 wt. percent phosphorus, 20.10 wt. percent sulfur, and 12.9 wt. percent oxygen (by difference).

*Example III*

This example illustrates the preparation of the alkylene oxide adducts of the invention.

To a reaction flask, fitted with a gas inlet tube, thermometer, stirrer and Dry Ice condenser, 389.0 grams of the black reaction product of Example I was charged and nitrogen was passed through the flask. The flask contents was heated to 121° C. and ethylene oxide was added until vigorous reflux of the reaction mixture was obtained (30 minute period). The temperature during reflux rose to 127° C. At the end of the 30 minute period, the heat was cut off and the flask swept with nitrogen until all the unreacted ethylene oxide had been purged therefrom. The final adduct was a dark brown liquid weighing 448 grams, having a Neut. No. of 33.8, a Sap. No. of 152.7 and an elemental analysis of 64.8 wt. percent carbon, 10.2 wt. percent hydrogen, 3.70 wt. percent phosphorus, 19.2 wt. percent sulfur and 2.1 wt. percent (by difference) oxygen. The infrared absorption of the product indicated the presence of hydroxyl radicals.

*Example IV*

This example illustrates the preparation of the haloalkylene oxide adducts of the invention.

The black fluid reaction product of Example I in an amount of 332 grams was added to a flask equipped with a Dry Ice condenser, thermometer, gas addition tube, and stirrer. The reaction product was heated to 125° C. under nitrogen atmosphere and 18.5 grams of epichlorohydrin was added dropwise, and the resultant reaction mixture was heated for 2 hours at 125±5° C. At the end of the reaction period, the black liquid adduct was analyzed and found to have a Neut. No. of 45.0, a Sap. No. of 132, and an elemental analysis of: 65.2 wt. percent carbon, 10.2 wt. percent hydrogen, 3.5 wt. percent phosphorus, 17.9 wt. percent sulfur, 2.5 wt. percent oxygen (by difference) and 0.74 wt. percent chlorine.

*Example V*

The brown liquid adduct of Example III was heated to a temperature of 176–177° C. under a blanket of nitrogen for a period of 4 hours, and the final modified adduct was found to be a black liquid having a Neut. No. of 19.4, a Sap. No. of 83.7 and an elemental analysis of 67% carbon, 10.5% hydrogen, 2.1% phosphorus, 17% sulfur, and 3.4% oxygen (by difference).

To demonstrate the excellent improvement in load carrying abilities of lubricants containing the adducts of the invention, lubricating oils and greases containing said adducts were subjected to the Mean Hertz Load Test. The results obtained utilizing the Mean Hertz Load Test on various adduct containing lubricants are set forth below on the following table:

TABLE I.—MEAN HERTZ LOAD TEST

| | Kilograms |
|---|---|
| Base Oil A | 20 |
| Base Oil A+2.6 wt. percent adduct of Example III | 26 |
| Base Oil A+2.6 wt. percent adduct of Example IV | 41 |
| Base Grease A | 19 |
| Base Grease A+3 wt. percent adduct of Example III | 33 |
| Base Grease A+3 wt. percent adduct of Example IV | 28 |
| Base Grease A+3 wt. percent adduct of Example V | 30 |

Base Oil A is composed of two hydrocarbon mineral oils comprising 53 wt. percent mineral oil X and 47 wt. percent mineral oil Y of the following compositions:

| Tests | Mineral Oil X | Mineral Oil Y |
|---|---|---|
| Gravity, ° API | 24 | 29.2 |
| Flash, COC, ° F | 555 | 450 |
| Fire, COC, ° F | 605 | 510 |
| Viscosity: | | |
| SUS at 100° F | | 342.0 |
| SUS at 210° F | 147.2 | 54.07 |
| Kin. at 100° F | 635.7 | 73.8 |
| Kin. at 210° F | 31.1 | |

Base grease A employed comprised of 68.5 wt. percent di-2-ethylhexyl sebacate, 22.8 weight percent of a mineral oil having an SUS viscosity at 100° F. of 98 and 39 at 210° F., 8.5 wt. percent lithium 12-hydroxystearate and 0.2 wt. percent lithium hydroxide. Both the grease and oil were compounded by adding the adduct to the stirred grease and oil heated to 200° F., followed by 30 minutes of additional stirring. In addition, the grease formulation was then passed through a colloidal mill.

We claim:

1. A method of preparing an alkylene oxide adduct of a hydrolyzed alkyl alkylacrylate-$P_2S_5$ reaction product comprising:

(1) contacting $P_2S_5$ with an alkylacrylate of the formula:

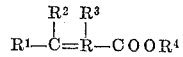

where $R^1$, $R^2$ and $R^3$ are selected from the group consisting of hydrogen and alkyl from 1 to 4 carbons and $R^4$ is alkyl from 1 to 24 carbons in a mole ratio of said $P_2S_5$ to said alkylacrylate of between about 1:1 and 4:1 in the presence of between about 1 and 5 wt. percent elemental sulfur based on the weight of the reactants at a temperature of between about 150 and 200° C. and in an inert atmosphere to form an alkylacrylate-$P_2S_5$ addition product;

(2) contacting said addition product with steam at a temperature between about 100 and 150° C. to form hydrolyzed alkyl alkylacrylate-$P_2S_5$ reaction product and inorganic phosphorus acids;

(3) separating out said inorganic phosphorus acids;

(4) contacting the residual hydrolyzed alkyl alkylacrylate-$P_2S_5$ reaction product with an alkylene oxide selected from the group consisting of the formulae:

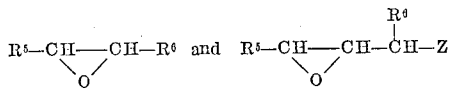

wherein $R^5$ and $R^6$ are selected from the group consisting of hydrogen and alkyl from 1 to 6 carbons and Z is halogen at temperature between about 60 and 150° C. in a mole ratio of said alkylene oxide to said hydrolyzed reaction product of between about 1:1 and 4:1 to form said alkylene oxide adducts of hydrolyzed hydrocarbon hydrolyzed alkyl alkylacrylate-$P_2S_5$ reaction product.

2. A method in accordance with claim 1 wherein said alkylene oxide adduct of hydrolyzed alkyl alkylacrylate-$P_2S_5$ reaction product is further heated at a temperature of about between 150 and 200° C.

3. A method in accordance with claim 1 wherein said alkyl alkylacrylate is octadecyl methacrylate and said alkylene oxide is ethylene oxide.

4. A method in accordance with claim 1 wherein said alkyl alkylacrylate is octadecyl methacrylate and said alkylene oxide is epichlorohydrin.

5. A method in accordance with claim 2 wherein said alkylene oxide is ethylene oxide and said alkyl alkylacrylate is octadecyl methacrylate.

6. An alkylene oxide adduct of hydrolyzed alkyl alkylacrylate-$P_2S_5$ reaction product produced by:

(1) contacting $P_2S_5$ with an alkylacrylate of the formula:

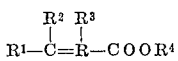

where $R^1$, $R^2$ and $R^3$ are selected from the group consisting of hydrogen and alkyl from 1 to 4 carbons and $R^4$ is alkyl from 1 to 24 carbons in a mole ratio of said $P_2S_5$ to said alkylacrylate of between about 1:1 and 4:1 in the presence of between about 1 and 5 wt. percent elemental sulfur based on the weight of the reactants at a temperature of between about 150 and 200° C. and in an inert atmosphere to form an alkylacrylate-$P_2S_5$ addition product;

(2) contacting said addition product with steam at a temperature between about 100 and 150° C. to form hydrolyzed alkyl alkylacrylate-$P_2S_5$ reaction product and inorganic phosphorus acids;

(3) separating out said inorganic phosphorus acids;

(4) contacting the residual hydrolyzed alkyl alkylacrylate-$P_2S_5$ reaction product with an alkylene oxide selected from the group consisting of the formulae:

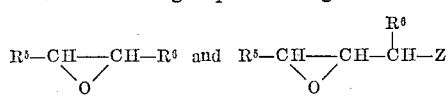

wherein $R^5$ and $R^6$ are selected from the group consisting of hydrogen and alkyl from 1 to 6 carbons and Z is halogen at temperature between about 60 and 150° C. in a mole ratio of said alkylene oxide to said hydrolyzed reaction product of between about 1:1 and 4:1 to form said alkylene oxide adducts of hydrolyzed hydrocarbon hydrolyzed alkyl alkylacrylate-$P_2S_5$ reaction product.

7. An adduct in accordance with claim 6 wherein said alkylene oxide adduct of hydrolyzed alkyl alkylacrylate-$P_2S_5$ reaction product is further heated at a temperature of about between 150 and 200° C.

8. An adduct in accordance with claim 6 wherein said alkyl alkylacrylate is octadecyl methacrylate and said alkylene oxide is ethylene oxide.

9. An adduct in accordance with claim 6 wherein said alkyl alkylacrylate is octadecyl methacrylate and said alkylene oxide is epichlorohydrin.

10. An adduct in accordance with claim 7 wherein said alkylene oxide is ethylene oxide and said alkyl alkylacrylate is octadecyl methacrylate.

11. A lubricating composition of improved load bearing properties comprising a major proportion of lubricating oil and between about 0.2 and 10 wt. percent of an alkylene oxide adduct of hydrolyzed alkyl alkylacrylate-$P_2S_5$ reaction product produced by:

(1) contacting $P_2S_5$ with an alkylacrylate of the formula:

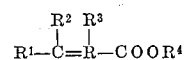

where $R^1$, $R^2$ and $R^3$ are selected from the group consisting of hydrogen and alkyl from 1 to 4 carbons and $R^4$ is alkyl from 1 to 24 carbons in a mole ratio of said $P_2S_5$ to said alkylacrylate of between about 1:1 and 4:1 in the presence of between about 1 and 5 wt. percent elemental sulfur based on the weight of the reactants at a temperature of between about 150 and 200° C. and in an inert atmosphere to form an alkylacrylate-$P_2S_5$ addition product;

(2) contacting said addition product with steam at a temperature between about 100 and 150° C. to form hydrolyzed alkyl alkylacrylate-$P_2S_5$ reaction product and inorganic phosphorus acids;

(3) separating out said inorganic phosphorus acids;

(4) contacting the residual hydrolyzed alkyl alkylacrylate-$P_2S_5$ reaction product with an alkylene oxide selected from the group consisting of the formulae:

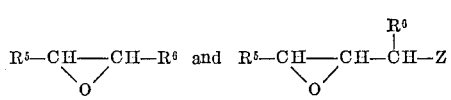

wherein $R^5$ and $R^6$ are selected from the group consisting of hydrogen and alkyl from 1 to 6 carbons and Z is halogen at temperature between about 60 and 150° C. in a mole ratio of said alkylene oxide to said hydrolyzed reaction product of between about 1:1 and 4:1 to form said alkylene oxide adducts of hydrolyzed hydrocarbon hydrolyzed alkyl alkylacrylate-$P_2S_5$ reaction product.

12. A lubricating composition of claim 11 containing between 5 and 45 wt. percent.

13. A lubricating composition in accordance with claim 11 wherein said lubricating oil is a mineral oil having an SUS viscosity at 100° F. of between about 50 and 1000 and said adduct is present in an amount between about 1 and 10 wt. percent.

14. A lubricating composition in accordance with claim 12 wherein said lubricating oil is a mixture of a synthetic ester lube oil and a mineral oil having an SUS viscosity at 100° F. of between about 50 and 1000, said adduct is present in an amount between about 1 and 10 wt. percent.

15. A lubricating composition in accordance with claim 13 wherein said adduct is further heated at a temperature of about between 150 and 200° C.

16. A lubricating composition in accordance with claim 13 wherein said alkyl alkylacrylate is octadecyl methacrylate and said alkylene oxide is ethylene oxide.

17. A lubricating composition in accordance with claim 13 wherein said alkyl alkylacrylate is octadecyl methacrylate and said alkylene oxide is epichlorohydrin.

18. A lubricating composition in accordance with claim 14 wherein said alkyl alkylacrylate is octadecyl methacrylate and said alkylene oxide is ethylene oxide.

19. A lubricating composition in accordance with claim 14 wherein said alkyl alkylacrylate is octadecyl methacrylate and said alkylene oxide is epichlorohydrin.

20. A lubricating composition in accordance with claim 14 wherein said adduct is further heated at a temperature of about between 150 and 200° C.

21. A lubricating composition in accordance with claim 20 wherein said alkyl alkylacrylate is octadecyl methacrylate and said alkylene oxide is ethylene oxide.

References Cited by the Examiner
UNITED STATES PATENTS

| | | | |
|---|---|---|---|
| 2,773,860 | 12/56 | Musselman | 260—125 |
| 2,914,478 | 11/59 | Neff | 252—46.6 |
| 3,004,996 | 10/61 | Arakelian et al. | 260—348 |

DANIEL E. WYMAN, *Primary Examiner.*